United States Patent [19]
Komura et al.

[11] 4,440,821
[45] Apr. 3, 1984

[54] HEAT SHRINKABLE MATERIAL

[75] Inventors: Minoru Komura; Yasuhiro Moriyama, both of Ibaraki, Japan

[73] Assignee: Nitto Electric Industrial Co., Ltd., Ibaraki, Japan

[21] Appl. No.: 141,225

[22] Filed: Apr. 17, 1980

[30] Foreign Application Priority Data

Apr. 20, 1979 [JP] Japan .............................. 54-53774[U]

[51] Int. Cl.³ ............................................. B32B 3/10
[52] U.S. Cl. ............................... 428/195; 174/DIG. 8; 427/208.6; 427/208.8; 427/265; 427/286; 428/200; 428/212; 428/347; 428/349; 428/913
[58] Field of Search ............... 427/208.2, 208.4, 208.6, 427/208.8, 256, 261, 265, 286, 288; 428/200, 212, 214, 347, 349, 913, 195, 211; 174/DIG. 8

[56] References Cited

U.S. PATENT DOCUMENTS

| | | | |
|---|---|---|---|
| 2,294,347 | 8/1942 | Bauer et al. | 428/212 X |
| 2,975,091 | 3/1961 | Tobey | 428/57 |
| 3,881,041 | 4/1975 | Glienke | 428/200 X |

*Primary Examiner*—Bruce H. Hess
*Attorney, Agent, or Firm*—Sughrue, Mion, Zinn, Macpeak and Seas

[57] ABSTRACT

Heat shrinkable material comprising a heat shrinkable substrate and a layer of different kinds of adhesives provided on the substrate, which exhibits excellent impact resistance and adhesion properties over a wide temperature range.

1 Claim, 4 Drawing Figures

HEAT SHRINKABLE MATERIAL

BACKGROUND OF THE INVENTION

1. Field of the Invention

This invention relates to heat shrinkable material which is suitable for use in covering terminals or joints of power cables, telegraph cables, etc., and joints of various types of fluid transport pipes.

2. Description of the Prior Art

Heat shrinkable materials conventionally used for covering terminals or joints of electric cables and transport pipes include: (1) a material comprising a heat shrinkable substrate and a layer of an adhesive provided on the whole surface of one side of the substrate, said adhesive being capable of adhering at ordinary temperatures; and (2) a material comprising a heat shrinkable substrate and a layer of an adhesive provided on the whole surface of one side of the substrate, said adhesive being incapable of adhering at ordinary temperature, but being capable of adhering when heated. The ordinary temperature used herein means the temperatures where the adhesive is used, and is generally from about $-20°$ to $50°$ C.

The former heat shrinkable material has high impact strength, and exhibits good adhesion at low temperatures (e.g., about $10°$ C. or less), but their adhesion strength is liable to decrease at higher temperatures.

The latter heat shrinkable material seldom gives rise to the problem of reduction in adhesion strength as is encountered with the former material. However, where it is used for covering, for example, steel pipes for transportation of fluid, adhesion breakage at the interface of the surface of the steel pipe and the adhesive occurs readily upon an impact from outside onto the area covered with the material. This leads to interfacial peeling of the adhesive, since the adhesive has relatively low elasticity. This tendency becomes more marked as the temperature decreases.

Pipes for the transportation of fluids are often protected from corrosion by passing a small quantity of an electric current therethrough. When the pipes are covered with known heat shrinkable materials, however, a small amount of hydrogen gas is produced by the electric current, thus causing peeling of the adhesive (i.e., cathodic peeling).

Furthermore, it has been found that once the interfacial peeling or cathodic peeling occurs, it is propagated and the peeled area extends rapidly.

SUMMARY OF THE INVENTION

This invention provides a heat shrinkable material which has eliminated the problems of the prior art heat shrinkable materials. The invention comprises (1) a heat shrinkable substrate, (2) a layer of a first adhesive (A) provided in a dot-, net- or stripe-like pattern from on one side of the substrate, said first adhesive (A) being capable of adhering at ordinary temperatures and being fluid at ordinary temperature, and (3) a layer of at least one of a second adhesive (B) and a third adhesive (C) provided on the same side of the substrate on the areas where the first adhesive (A) has not been coated, said second adhesive (B) being incapable of adhering at ordinary temperature, but capable of adhering when heated and said third adhesive (C) being of the thermosetting type.

DETAILED DESCRIPTION OF THE INVENTION

Figure 2:
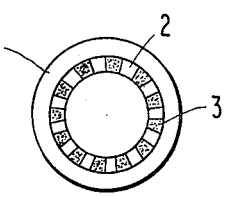
FIG. 2 is a cross-sectional view of another tubular embodiment according to this invention.

Heat shrinkable substrates for use in this invention are conventional as disclosed in, for example, U.S. Pat. Nos. 2,027,902 and 3,086,242, and can be produced from a thermoplastic resin such as polyethylene, polypropylene, polyvinyl chloride, an ethylene-vinyl acetate copolymer or a fluorocarbon polymer; a rubber such as natural rubber, silicone rubber, butyl rubber or ethylenepropylene copolymer rubber; or a mixture thereof; and optionally a suitable amount of additives such as anti-aging agents, fillers, and coloring agents.

The mixture is kneaded uniformly, and molded into the desired form. Examples of such forms include a sheet, tubular forms, such as a straight tube (including tubes with one end thereof closed), a Y-shaped cylindrical member, and a T-shaped cylindrical member, and so forth. The thus formed substrate can be cross-linked if desired, and is provided with heat shrinkability by applying heat stretching processing.

According to this invention, a first adhesive (A) is coated in a dot-, not- or stripe-like pattern form on one side of the heat shrinkable substrate, namely, on the surface which is to be in contact with an article to be covered. The first adhesive (A) may be coated in the form of a mixture of two or three of the above pattern forms.

The first adhesive (A) is capable of adhering and is a fluid at ordinary temperatures. Adhesives which can be used as the first adhesive (A) include pressure-sensitive adhesives, mastic type adhesives, and a self-adherable adhesives, which are produced by adding suitable amounts of a tackifier such as rosin, a terpene resin, a cumaron resin or a phenol resin, a plasticizer, a softening agent or anti-aging agent, to rubber, acrylic acid based polymers, asphalt or the like.

After the first adhesive (A) is coated in then dot-, net- or stripe-like pattern form one one side of the heat shrinkable substrate, at least one of a second adhesive (B) and a third adhesive (C) is coated on the same side of the substrate on the areas where the first adhesive has not been coated, wherein the second adhesive (B) is incapable of adhering at ordinary temperature, but is capable of adhering when heated at about $60°$ to $250°$ C., preferably about $80°$ to $200°$ C., most preferably about $120°$ to $150°$ C., and the third adhesive (C) is thermosettable at about $60°$ to $250°$ C., preferably about $80°$ to $200°$ C., most preferably about $120°$ to $150°$ C.

The second adhesive (B) does not adhere at ordinary temperature, but on applying heat in order to heat-shrink the heat shrinkable substrate, the second adhesive softens or melts and exhibits adhesive properties. This is a hot-melt adhesive which is produced by adding predetermined amounts of additives such as a tackifier, wax, or an anti-aging agent to polyvinyl acetate, polyethylene, an ethylenevinyl acetate copolymer or rubber.

The third adhesive (C) is a thermosetting type adhesive, which comprises mainly an epoxy resin, an unsaturated polyester resin, a phenol resin or a urethane prepolymer. This adhesive hardens by reacting with a hardener such as amines, or peroxides. It is preferred that the hardener is enclosed, for example, in fine glass capsules, for incorporated into the third adhesive (C). These capsules are then broken by heat applied to heat-shrink the heat shrinkable substrate and by the shrinkage force of the substrate, resulting in intimate contact between the major component of the adhesive and the hardener, thus causing hardening of the adhesive.

The objects of this invention are attained by coating the first adhesive (A) in a dot-, net- or stripe-like pattern form on one side of the heat shrinkable substrate, thus forming areas where the first adhesive (A) is not coated, and thereafter coating at least one of the second adhesive (B) and third adhesive (C) on the areas where the first adhesive (A) has not been coated.

It is preferred that the first adhesive (A) is coated in a pattern and manner so as to minimize the space between the adjacent areas of the first adhesive (A) while providing sufficient space such that the adjacent areas of the first adhesive do not join together due to fluidity caused by heating applied for heat-shrinkage of the heat shrinkable substrate. The smaller space is better, but the space is generally about 2 to 3 mm.

The second adhesive (B) and third adhesive (C) used in this invention are conventional ones, and the weight ratio of the base resin or polymer and various additives are not particularly limited. The type of adhesive can easily be selected depending upon use conditions of the adhesive.

Further with respect to the heat shrinkable material of this invention, the first adhesive (A) and the second adhesive (B) (if present) and the third adhesive (C) (if present) adhere to an article to be covered when it is heat-shrunk, and the contact density (number of adhered portions of each adhesive in a unit area on the surface of article to which the adhesives are applied) of these adhesives to the article to be covered increases. Therefore when the heat shrinkable material of this invention is applied to the article to be covered, the second adhesive (B) or third adhesive (C) exhibit adhesive properties when the covered area is exposed to high temperatures (e.g., about 60° to 150° C.), whereas when the covered area is exposed to low temperature (e.g., about −10° C. or less), the first adhesive (A) mainly exhibits adhesion properties, thereby maintaining steady adhesion between the article and the material over a wide temperature range.

The use of the third adhesive (C) provides for those heat shrinkable materials which are especially suitable for covering articles which are to be exposed to particularly high temperature, because its heat resistance is higher than that of the second adhesive (B).

In addition, since the third adhesive (C) provides especially high adhesive strength, the heat shrinkable material produced using the third adhesive (C) has the effect of preventing shear peeling (i.e., the peeling caused by shear stress). For example, when steel pipes with joints covered with the heat shrinkable material are buried under the ground, they repeatedly expand and contract due to changes in the temperature. During this period, shear stress (deviation stress) is created between the pipe and sand surrounding the pipe, and this stress acts on the material adhered to the surface of the pipe. In this case, the third adhesive (C) provides especially high adhesive strength, and shear peeling of the material is markedly prevented.

Various embodiments of the invention will hereinafter be explained in detail by reference to the accompanying drawings.

Figure 1:
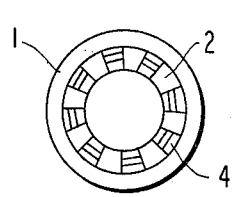
FIG. 1 is a cross-sectional view of a tubular embodiment of heat shrinkable material according to this invention.

FIG. 1 is a cross-sectional view of a tubular embodiment of the invention. A first adhesive (A) (2) is coated as a number of dots on the whole surface on one side (viz., the inside) of the substrate (1). A second adhesive (B) (3) is coated at the areas where the first adhesive (A) has not been coated.

FIG. 2 is a cross-sectional side view of another embodiment wherein a number of dots of the first adhesive (A) (2) are provided on the inner surface of a tube-like heat shrinkable material (1), and the third adhesive (C) (4) is coated on the areas where no first adhesive (A) has been coated. This coating manner is generally employed in, for example, gravure printing techniques.

In another embodiment of this invention (see discussion of FIG. 3 below), both a second adhesive (B) and a third adhesive (C) may be coated on the areas where no first adhesive (A) has been provided.

Figure 3:
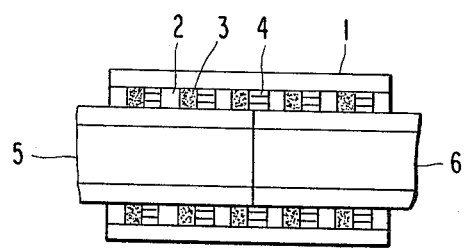
FIG. 3 is another cross-sectional view of a tubular heat shrinkable material according to this invention showing practical use thereof.

When the heat shrinkable material of this invention is used for covering joints of steel pipes, as illustrated in FIG. 3, the first adhesive (A) (2), the second adhesive (B) (3), and the third adhesive (C) (4) all adhere to the surfaces of pipes (5) and (6). Therefore, when impact is applied onto the covered zone, the impact acting on the second adhesive (B) (3) and the third adhesive (C) (4) is buffered by the first adhesive (A) (2), whereby interfacial peeling is prevented. Even if the interfacial peeling was to occur between the pipes (5) and (6), and adhesives (B) (3) and (C) (4), the covered material would still be held on the pipes (5) and (6) by the action of the first adhesive (A) (2).

Furthermore, when interfacial breakage occurs for the second adhesive (B) (3) and third adhesives (C) (4), the propagation of interfacial breakage is prevented because the first adhesive (A) (2), which has adhesion properties and fluidity at ordinary temperature, exists between various portions of the other adhesives (B) (3) and (C) (4).

Furthermore, even if interfacial breakage occurred, the first adhesive (A) (2) having fluidity at ordinary temperature would flow into the broken zone, filling up and repairing it in a very short period of time, whereby the corrosion of pipes (5) and (6) are prevented.

Figure 4:
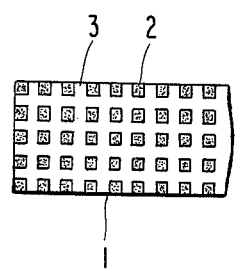
FIG. 4 is a partially cut-away plane view of an embodiment of heat shrinkable material according to the invention.

FIG. 4 illustrates another embodiment of the heat shrinkable material of this invention in practical use, in which a first adhesive (A) (2) is coated in a net-like form on one side of a long sheet-like heat shrinkable material (1), and a second adhesive (B) (3) is coated at the areas where no adhesive (A) (2) has been coated. Although not shown in the figure, a separator can be temporarily attached to the adhesive surface in order to prevent undesired materials from attaching to the adhesive surfaces.

According to this invention, as described above in detail, the first adhesive (A), and the second adhesive (B) and/or the third adhesive (C) are provided on the heat shrinkable material, and all of these adhesives adhere to the surface of the material. Therefore, the heat shrinkable material of this invention exhibits excellent impact resistance and adhesion properties over a wide temperature range from low temperatures to high temperatures (e.g., about −60° to 150° C.). Moreover, since the first adhesive (A) has the effect of preventing the interfacial peeling and cathodic peeling due to adhesion breakage, no peeling takes place of the material from the article on which the material has been provided. In addition, for the heat shrinkable material produced using the third adhesive (C), the prevention of shear peeling is especially marked.

While the invention has been described in detail and with reference to specific embodiments thereof, it will be apparent to one skilled in the art that various changes and modifications can be made therein without departing from the spirit and scope thereof.

What is claimed is:

1. A heat shrinkable material suitable for covering terminals or joints of electric cables and fluid transport pipes consisting essentially of:
   (1) a heat shrinkable substrate,
   (2) a layer of a first adhesive (A) provided in a dot-, net-, or stripe-like pattern form on one side of the substrate, said first adhesive (A) being capable of adhering at ordinary temperature and being fluid at ordinary temperature,
   (3) a layer of a hot-melt second adhesive (B) provided on the same side of the substrate on certain areas where none of the first adhesive (A) has been coated, said hot-melt second adhesive (B) being incapable of adhering at ordinary temperature but capable of adhering when heated, and
   (4) a layer of a third adhesive (C) provided on the same side of the substrate on the areas contiguous to the layer formed by the layer of first adhesive (A) and the layer of hot-melt second adhesive (B) where none of the first adhesive (A) or the hot-melt second adhesive (B) has been coated, said third adhesive (C) being of the thermosetting type.

* * * * *